(12) United States Patent
Cornelius et al.

(10) Patent No.: US 7,377,945 B2
(45) Date of Patent: May 27, 2008

(54) CLEANING METHOD

(75) Inventors: Gay Joyce Cornelius, Cottingham (GB); Malcolm Tom McKechnie, Driffield (GB)

(73) Assignee: Reckltt Bencklser (UK) Limited, Slough, Berkshire (GB)

( * ) Notice: Subject to any disclaimer, the term of this patent is extended or adjusted under 35 U.S.C. 154(b) by 293 days.

(21) Appl. No.: 10/363,346

(22) PCT Filed: Sep. 3, 2001

(86) PCT No.: PCT/GB01/03927

§ 371 (c)(1),
(2), (4) Date: Feb. 28, 2003

(87) PCT Pub. No.: WO02/18280

PCT Pub. Date: Mar. 7, 2002

(65) Prior Publication Data

US 2003/0183253 A1    Oct. 2, 2003

(30) Foreign Application Priority Data

Sep. 1, 2000 (GB) .................. 0021585.5
Sep. 20, 2000 (GB) .................. 0023056.5
Dec. 13, 2000 (GB) .................. 0030365.1

(51) Int. Cl.
*D06F 39/02* (2006.01)
(52) U.S. Cl. ................ 8/137; 8/147; 68/17 R
(58) Field of Classification Search ............... 134/93; 68/17 R, 207
See application file for complete search history.

(56) References Cited

U.S. PATENT DOCUMENTS

| | | | | |
|---|---|---|---|---|
| 1,797,622 A * | 3/1931 | Scofield ........................ 68/183 |
| 2,882,243 A * | 4/1959 | Milton ........................ 423/718 |
| 3,148,687 A * | 9/1964 | Dosch ........................ 134/58 D |
| 3,363,637 A * | 1/1968 | Rumbaugh ................... 134/109 |
| 3,424,545 A * | 1/1969 | Robert ........................ 8/137 |
| 3,814,292 A * | 6/1974 | Dargols ........................ 222/190 |
| 3,970,594 A | 7/1976 | Claybaugh ................... 510/438 |
| 4,025,427 A * | 5/1977 | Loeb ........................ 210/675 |
| 4,039,444 A | 8/1977 | Bory et al. ................... 210/679 |
| 4,066,394 A * | 1/1978 | Leonard ........................ 8/137 |
| 4,077,891 A | 3/1978 | Beimesch et al. ........... 510/520 |
| 4,118,525 A * | 10/1978 | Jones ........................ 8/137 |
| 4,120,653 A * | 10/1978 | Smolka ........................ 8/137 |
| 4,144,093 A * | 3/1979 | Reinwald et al. ............ 134/13 |
| 4,164,430 A * | 8/1979 | Reinwald et al. ............ 134/13 |
| 4,259,373 A * | 3/1981 | Demessemaekers et al. ... 427/242 |
| 4,348,293 A | 9/1982 | Clarke et al. ................ 252/90 |
| 4,374,035 A * | 2/1983 | Bossu ........................ 252/186.26 |
| 4,472,287 A * | 9/1984 | Ramachandran et al. ... 510/292 |
| 4,659,496 A | 4/1987 | Klemm et al. .............. 252/90 |
| 4,806,261 A * | 2/1989 | Ciallella et al. ............ 510/296 |
| 4,818,421 A * | 4/1989 | Boris et al. ................. 510/297 |
| 4,929,367 A * | 5/1990 | Thomas et al. .............. 8/137 |
| 4,995,985 A | 2/1991 | Scott et al. ................. 210/679 |
| 5,211,689 A * | 5/1993 | Kobayashi ................... 206/5 |
| 5,309,739 A * | 5/1994 | Lee ........................ 68/3 SS |
| 5,421,174 A * | 6/1995 | Kim et al. ................... 68/17 A |
| 5,520,819 A | 5/1996 | Asahi et al. ................ 210/727 |
| 5,567,451 A | 10/1996 | Rinn et al. ................... 426/13 |
| 5,578,217 A | 11/1996 | Unger et al. ................ 210/670 |
| 5,755,992 A * | 5/1998 | Jeffrey et al. ............ 252/186.38 |
| 5,792,738 A * | 8/1998 | Baillely et al. ............ 510/375 |
| 5,794,290 A * | 8/1998 | Roberts ........................ 8/159 |
| 5,863,887 A | 1/1999 | Gillette ........................ 510/520 |
| 5,919,894 A | 7/1999 | Schubart ..................... 528/328 |
| 5,946,951 A * | 9/1999 | Watanabe .................. 68/235 R |
| 5,978,994 A * | 11/1999 | Anderson ...................... 8/158 |
| 6,308,356 B1 * | 10/2001 | Frederick et al. ............. 8/158 |
| 6,602,845 B2 * | 8/2003 | Demeyere et al. .......... 510/437 |
| 6,612,137 B2 * | 9/2003 | Smulowitz .................. 68/13 R |
| 2002/0055449 A1* | 5/2002 | Porta et al. ................. 510/295 |

FOREIGN PATENT DOCUMENTS

| | | |
|---|---|---|
| EP | 0 011 501 A | 5/1980 |
| EP | 0 279 471 A | 8/1988 |
| EP | 0 380 228 A2 | 8/1990 |
| GB | 616863 | 1/1949 |
| GB | 909218 | 10/1962 |
| GB | 935956 | 9/1963 |
| GB | 1063669 | 3/1967 |
| GB | 1285031 | 8/1972 |
| GB | 1534722 | 12/1978 |
| GB | 2178753 A | 2/1987 |
| GB | 2191781 A | 12/1987 |
| GB | 2 195 652 * | 4/1988 |
| GB | 2217622 A | 1/1989 |
| WO | 96 34908 A1 | 11/1996 |

(Continued)

OTHER PUBLICATIONS

European Patent Office 1 085 118 Sep. 2002.*

(Continued)

Primary Examiner—Frankie L. Stinson

(57) ABSTRACT

A method of cleaning household articles entails contacting cleaning water with a container containing a substantially water-insoluble modifying agent able to bind calcium ions. The container is permeable to water and to calcium ions but retains the modifying agent. The container may be a bag, for example of textile or paper.

18 Claims, 1 Drawing Sheet

FOREIGN PATENT DOCUMENTS

WO          01 21536 A      3/2001

OTHER PUBLICATIONS

Figure 1:
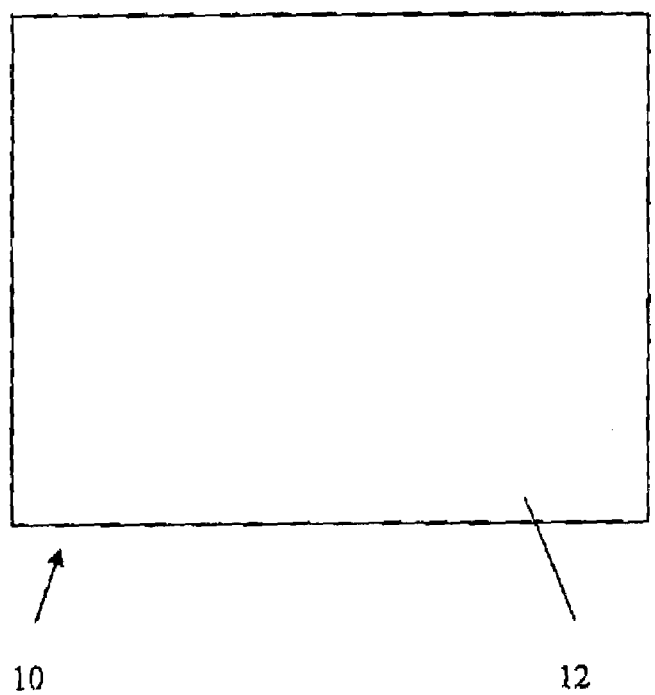

European Patent Office 0 343 069 Nov. 1989.*
European Patent Office 0 393 481 Oct. 1990.*
PCT International Search Report, dated Dec. 14, 2001; for PCT/GB01/03927.
GB Search Report, dated Feb. 12, 2001, for GB 002158.5.
GB Search Report, dated Mar. 8, 2001, for GB 0023056.5.
GB Search Report, dated Mar. 26, 2002, for GB 0121278.6.
GB Search Report, dated Jul. 31, 2001, for GB 0030365.1.
Derwent Abstract No. 1978-11639A relating to JP530001208.
Patent Abstracts of Japan, vol. 010, No. 172, Jun. 18, 1986, JP 61 021781 A.
Derwent Abstract No. 1990-265591 relating to JP 020187192.
Derwent Abstract No. 1987-353298 relating to JP 620258314.
WPI Abstract Accession No. 1990-265591 & JP 020187192.
WP Abstract Accession No. 1987-353298 & JP 620258314.
WPI Abstracts Accession No. 1978-11639A & JP 1970075686.

* cited by examiner

CLEANING METHOD

This invention relates to a method of cleaning using aqueous solutions. In certain aspects the invention relates products useful in such methods.

It is well known that certain metal compounds, notably calcium compounds, have a significant effect on the properties of water. "Hard" water containing a significant loading of soluble calcium and magnesium compounds form a scum with soap or detergent and may require a large amount of soap or detergent in order for a lather to form. Scale deposits can readily form from such water, for example on heating or pH change or evaporation. These deposits can be encrustations, or watermarks left on evaporation of water droplets from, especially, a shiny surface.

There have been many proposals for the removal of metal ions from aqueous solutions. In the industrial context proposals have included filter beds and polymeric filters for capturing heavy metal ions from an aqueous solution flowing within a passageway. Examples are given in EP-A-992238 and GB-A-20869564. In the domestic context sequestrants can be added to an aqueous washing solution and these can capture metal ions, such as calcium ions. Examples of such sequestrants are given in EP-A-892040. However in a multi-step washing process, such as that carried out by a clothes washing machine, it can be a problem that the sequestrant is discharged with waste water, at an intermediate stage of the process, and is not available for later stages. Furthermore the waste water, containing the sequestrant, may be regarded as environmentally undesirable. Another example from a domestic context is water jugs having a filter cartridge through which water trickles from an upper chamber to a lower chamber. The cartridges typically contain an ion exchange resin and activated charcoal. They are reasonably effective but many consumers decline to purchase such jugs, which are, of necessity, bulky and cumbersome.

There is a need for a product which can change the properties of a water sample, for example by binding metal ions present in water, at least calcium ions and preferably also other metal ions, in a convenient manner, preferably through the entire course of a procedure (for example a washing process) and preferably in such a manner as to avoid or minimise undesirable sequestrant components in the treated water.

FIG. 1 depicts an embodiment of a container according to the invention.

In accordance with a first aspect of the present invention there is provided a method of cleaning household articles, wherein cleaning water is contacted with a container having an enclosing wall and containing a substantially water-insoluble modifying agent able to bind calcium ions, the wall being permeable to the water and to components dissolved therein but retaining the substantially water-insoluble modifying agent.

By substantially water-insoluble modifying agent we mean a modifying agent, more than 50% wt, preferably at least 70% wt, more preferably at least 85% wt and most preferably at least 95% wt, and optimally 100% wt, of which is retained in the container, when the container is used under the most rigorous conditions for which it is intended.

A method of cleaning may be a method of ware washing using a machine, for example a clothes washing machine or a dishwashing machine; the household article accordingly may be an item of kitchenware and tableware, for example crockery, glassware and tableware, or a textile article such as an item of clothes or bed linen or a towel. In such a method the modifying agent may soften the washing water, reduce or eliminate the formation of scum in the water and reduce or eliminate the deposition of limescale, and preferably other metal compounds, from the water. Unlike the known sequestrants mentioned above, formulated to be washed away before the rinse cycle, in the present method the container is preferably present during the rinse cycle; either only the rinse cycle, or preferably, throughout the washing operation, including the rinse cycle. In such methods a cleaning agent is delivered to the machine by dissolution of a liquid or solid cleaning concentrate loaded into the machine prior to the start of the washing operation. Such concentrates include a surfactant, for example an anionic surfactant, or a non-ionic surfactant, or a cationic surfactant, or an amphoteric surfactant, or any combination thereof. They typically also include one or more builders, which themselves act as sequestrants.

A suitable anionic surfactant used in such a method of the invention is an anionic organic surfactant, which is usually employed in a soluble salt form, preferably as an alkali metal salt, especially as a sodium salt. Although other types of anionic detergents may be utilized, such as higher fatty acyl sarcosides, alkyl sulphosuccinates, alkyl ether sulphosuccinates, alkylamide sulphosuccinates, alkyl sulphosuccinates, alkyl sulphoacetates, alkyl phosphates, alkyl ether phosphates, acyl isothionates, N-acyl taurates and acyl lactylates, or conventional "soaps" of fatty acids, the preferred anionic surfactants employed are those which are described as being of a sulphonate or sulphate type. These include linear higher alkylaryl sulphonates (for example alkylbenzene sulphonates), alkyl sulphates, alkyl ether sulphates, alkylamidoether sulphates, alkylarylpolyether sulphates, monoglyceride sulphates, alkyl sulphonates, alkylamido sulphonates, higher fatty alcohol sulphates, higher fatty alcohol polyalkoxylate sulphates, olefin sulphonates, $\alpha$-methyl ester sulphonates and paraffin sulphonates. An extensive listing of anionic detergents, including such sulph(on)ate surfactants, is given at pages 25 to 138 of the text Surface Active Agents and Detergents, Vol. II, by Schwartz, Perry and Berch, published in 1958 by Interscience Publishers, Inc., and is incorporated herein by reference. Usually the higher alkyl group of such anionic surfactants is of 8 to 24, especially 10 to 20 carbon atoms, preferably 12 to 18 carbon atoms, and the alkoxylate content of such anionic surfactants that are alkoxylated (preferably ethoxylated or ethoxylated/propoxylated) is in the range of 1 to 4 alkoxy groups per mole.

One preferred class of anionic surfactants comprise the alkali metal (preferably sodium) alkyl sulphates, preferably having linear $C_{12-18}$ alkyl groups.

Another preferred class of anionic surfactants comprise alkali metal (preferably sodium) alkylaryl sulphonates (especially alkylbenzene sulphonates), preferably having linear $C_{10-13}$ alkyl groups.

A preferred non-ionic surfactant used in this method of the invention is a condensation product of a higher fatty alcohol or alkyl phenol with a lower alkylene oxide, such as ethylene oxide or a mixture of ethylene oxide and propylene oxide. In such non-ionic surfactants the higher fatty moiety will normally be of 7 to 16 carbon atoms and there will usually be present from 3 to 20, preferably 4 to 15 moles of alkylene oxide per mole of higher fatty alcohol.

Another class of non-ionic surfactants that could be used are sorbitan esters of fatty acids having from 10 to 24 carbon atoms, for example sorbitan mono-oleate.

Amphoteric surfactants which may be used include amphoteric betaine surfactant compounds having the following general formula:

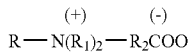

wherein R is a hydrophobic group which is an alkyl group containing from 10 to 22 carbon atoms, preferably from 12 to 18 carbon atoms, an alkylaryl or arylalkyl group containing a similar number of carbon atoms with a benzene ring being treated as equivalent to about 2 carbon atoms, and similar structures interrupted by amido or either linkages; each $R_1$ is an alkyl group containing from 1 to 3 carbon atoms; and $R_2$ is an alkylene group containing from 1 to 6 carbon atoms.

Examples of cationic surfactants which may be used include quaternary ammonium compounds and salts thereof, including quaternary ammonium compounds which also have germicidal activity and which may be characterized by the general structural formula:

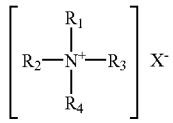

when at least one of $R_1$, $R_2$, $R_3$ and $R_4$ is a hydrophobic, aliphatic, aryl aliphatic or aliphatic aryl group containing from 6 to 26 carbon atoms, and the entire cationic portion of the molecule has a molecular weight of at least 165. The hydrophobic groups may be long-chain alkyl, long-chain alkoxy aryl, long-chain alkyl aryl, halogen-substituted long-chain alkyl aryl, long-chain alkyl phenoxy alkyl or aryl alkyl. The remaining groups on the nitrogen atoms, other than the hydrophobic radicals, are generally hydrocarbon groups usually containing a total of no more than 12 carbon atoms. The radicals $R_1$, $R_2$, $R_3$ and $R_4$ may be straight chain or may be branched, but are preferably straight chain, and may include one or more amide or ester linkages. The radical X may be any salt-forming anionic radical.

Examples of quaternary ammonium salts within the above description include the alkyl ammonium halides such as cetyl trimethyl ammonium bromide, alkyl aryl ammonium halides such as octadecyl dimethyl benzyl ammonium bromide, and N-alkyl pyridinium halides such as N-cetyl pyridinium bromide. Other suitable types of quaternary ammonium salts include those in which the molecule contains either amide or ester linkages, such as octyl phenoxy ethoxy ethyl dimethyl benzyl ammonium chloride and N-laurylcocoaminoformylmethyl)-pyridinium chloride. Other effective types of quaternary ammonium compounds which are useful as germicides includes those in which the hydrophobic radical is characterized by a substituted aromatic nucleus as in the case of lauryloxyphenyltrimethyl ammonium chloride, cetylaminophenyltrimethyl ammonium methosulphate, dodecylphenyltrimethyl ammonium methosulphate, dodecylphenyltrimethyl ammonium chloride and chlorinated dodecylphenyltrimethyl ammonium chloride.

Preferred quaternary ammonium compounds which act as germicides and which are useful in the present invention include those which have the structural formula:

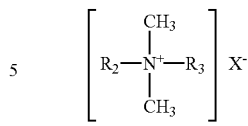

wherein $R_2$ and $R_3$ are the same or different $C_8$-$C_{12}$alkyl, or $R_2$ is $C_{12}$-$C_{16}$alkyl, $C_8$-$C_{18}$alkylethoxy, $C_8$-$C_{18}$alkylphenolethoxy and $R_2$ is benzyl, and X is a halide, for example chloride, bromide or iodide, or methosulphate. The alkyl groups $R_2$ and $R_3$ may be straight chain or branched, but are preferably substantially linear.

In any cleaning method of the invention, a mixture of two or more surfactants may be used. Other known surfactants not particularly described above may also be used. Such surfactants are described in McCutcheon's Detergents and Emulsifiers, North American Edition, 1982; Kirk-Othmer, Encyclopaedia of Chemical Technology, 3rd Ed., Vol. 22, pp 346-387.

It is preferred that the cleaning agent used in a machine washing method contains a builder. Suitable builders include water soluble inorganic salt builders, preferably sodium salts, such as sodium polyphosphates, e.g. sodium tripolyphosphate and sodium pyrophosphate, sodium carbonate, sodium bicarbonate, sodium sesquicarbonate, sodium silicate, sodium disilicate, sodium metasilicate and sodium borate. In addition to the water soluble inorganic salts, water insoluble builders may also be useful, including the ion exchanging zeolites, such as Zeolite 4A. Organic builders may also be employed. Among suitable organic builders are polyacetal carboxylates, as described in U.S. Pat. No. 4,725,455, and water soluble salts of lower hydroxycarboxylic acids, such as sodium citrate and sodium gluconate. However, a builder may not be necessary as the container may fulfil the main requirement of a builder, in removing calcium ions.

Alternatively a method of cleaning in accordance with the invention may be a manual method, for example using a hand-cloth or mop, and an open vessel, for example a bucket or bowl. Thus, the cleaning method could be a method of cleaning a hard surface, for example a window, a tiled surface, shower screen, dirty tableware and kitchenware, a sanitaryware article, for example a lavatory, wash basin or sink, a car (which we regard as a "household article" within the terms of this invention) or a kitchen worktop.

In a manual method the household article could also be a textile article. This could be as described above and could also be a carpet. The cleaning method for a carpet could be purely manual, or manual but assisted by an electrical cleaning device.

In manual methods the cleaning agent is preferably dissolved in water prior to the start of cleaning. The cleaning agent may comprise a surfactant, for example an anionic surfactant and/or a non-ionic surfactant, as described above.

The compositions used in any cleaning method of the invention may optionally include one or more conventional additives known to be useful in cleaning compositions including viscosity modification agents, fragrances (natural or synthetically produced), foaming or foam-control agents, solvents, fillers, scale inhibitors, colouring agents, bleaching agents, and, particularly in the case of compositions for fabric washing, anti-nucleating agents, fabric conditioning agents, enzymes, hydrotropes and dye anti-redeposition agents. A germicidal agent may be incorporated as an optional ingredient into the cleaning agents used in the invention. Examples are phenolic group containing compounds such as o-phenyl-phenol, o-benzyl[p-chlorophenol] and 4-tertamylphenol. However, as noted above, cationic surfactants mentioned above themselves have germicidal properties.

A container containing a sequestrant may act as a water softener, promoting improved cleaning, within a vessel containing water, for example a bucket, jug, sink, toilet cistern or ware-washing machine. By capturing calcium ions, any cleaning agent present in the water can work more effectively, and/or the vessel is soiled or scaled less, whether by soap scum or by encrustations or by watermarks ("spotting") left when droplets on a surface evaporate. For example the container may be used in the water used for cleaning windows or for washing a car, to soften the wash water and reduce "spotting".

A container containing a sequestrant may be disposed in a clothes washing machine throughout the wash and rinse cycles, for example by being placed in the machine's drum with laundry to be washed. Alternatively a container containing a sequestrant may be disposed in the rinse portion of the loading drawer of a clothes washing machine, such that rinse water flowing through the loading drawer and into the machine is rendered lower in calcium ion concentration.

A sequestrant, serving as a calcium-binding modifying agent, could comprise polymeric bodies, for example of ion exchange resin. Suitable forms include beads and fibres. Examples include polyacrylic acid and algins. A sequestrant could alternatively be an inorganic material, for example a granular zeolite which is retained by the container.

Algins may be found in and isolated from various organisms, in particular from algae belonging to the order Phaeophyceae and soil bacteria such as *Azotobacter vinelandii* and *Azotobacter crococcum* and from several strains of *Pseudomonas* bacteria. Common algal sources of algins include *Laminaria digitata, Ecklonia maxima, Macrocystis pyrifera, Lessonia nigrescens, Ascophyllum nodosum, Laminaria japonica, Durvillea antartica, Durvillea potatorum* and, especially, *Laminaria hyperborea*.

Alginic acid is a linear hetero-polysaccharide comprising units of β-D-mannuronic acid and α-L-guluronic acid. Alginic acid may comprise homopolymeric sequences of mannuronic acid, homopolymeric sequences of guluronic acid, and mixed sequences of mannuronic acid and guluronic acid units. Use of alginic acid itself is contemplated in the present invention.

Salts of alginic acid used in the method of the present invention may include alkali metal salts, for example sodium and potassium salts, and ammonium and alkanolamine salts. Alkali metal salts are of particular interest.

The term "algins" as used herein includes alginic acid and salts of alginic acid, irrespective of the relative proportion of mannuronic and guluronic units, and is intended to include glycolated or alkoxylated derivatives, especially those derivatised with propylene glycol. However, preferred compounds are not alkoxylated or glycolated. Guluronic acid-rich alginic acid and guluronic acid-rich salts of alginic acid are of particular interest. Preferred compounds have at least 50%, more preferably 55-99%, most preferably 60-80% of guluronic units (by weight), the balance being mannuronic units. For guidance on production of algins very high in guluronic units the reader is referred to WO 98/51710.

The polymeric bodies may, if not inherently sequestrant, be processed in any of a number of ways. Sequestrant side chains may be grafted onto the bodies, for example using the well-known techniques of radiation grafting or chemical grafting. Radiation grafting is described in WO 94/12545. Chemical grafting is described in GB 2086954A. Alternatively for certain side chains the polymeric bodies may be fabricated (for example melt spun) already bearing the sequestrant side-chains, as described in EP 486934A. In yet other embodiments polymeric bodies not bearing sequestrant side chains may be coated with material which has the side chains. The polymeric bodies may, in effect, be regarded as carrying the side chains by mechanical adhesion. Alternatively they may attach by cross-linking, as described in EP 992283A.

Preferably sequestrant side chains are any side-chains which can be carried by polymeric bodies, and which are able to bind calcium (and preferably other) ions, and whose effectiveness in doing that is not substantially diminished by a cleaning agent. Suitable calcium-binding side-chains include residues of acids, for example of acrylic or methacrylic acid, or carboxylic acids, or of sulphonic acids, or of phosphonic acids. Residues of organic acids are preferred. Particularly preferred are residues of methacrylic or, especially, acrylic acid.

Alternative calcium-binding side chains of polymeric bodies may include amino groups, quaternary ammonium salt groups and iminodicarboxyl groups —N{(CH$_2$)$_n$COOH}$_2$, where n is 1 or 2.

Further suitable calcium-binding side chains of polymeric bodies may include acyl groups as described in EP 984095A. These have the formula —C(O)—X(V)(Z)(M) or —C(O)—X(V) (Z) (S—M')

where X represents a residue in which one carboxyl group is eliminated from a monocarboxylic acid or dicarboxylic acid;
V represents hydrogen or a carboxyl group;
M represents hydrogen; or

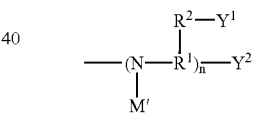

wherein R$^1$ represents a residue in which one hydrogen is eliminated from a carbon chain in an alkylene group, R$^2$ represents a direct bond or an alkylene group, Y$^1$ and Y$^2$ are the same or different and each represents hydrogen, a carboxyl group, an amino group, a hydroxy group or a thiol group, n is an integer of 1 to 4, M' represents hydrogen or

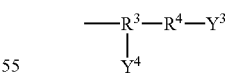

wherein R$^3$ represents a residue in which one hydrogen is eliminated from a carbon chain in an alkylene group; R$^4$ represents a direct bond or an alkylene group, Y$^3$ and Y$^4$ are the same or different and each represents hydrogen, a carboxyl group, an amino group, a hydroxy group or a thiol group; and Z represents hydrogen or has the same meaning as that of M.

Such side chains are preferably carried by polymeric fibres selected from polyolefins, poly(haloolefins), poly(vinylalcohol), polyesters, polyamides, polyacrylics, protein fibres and cellulosic fibres (for example cotton, viscose and rayon). Polyolefins are especially preferred, particularly polyethylene and polypropylene.

When side chains are grafted onto the base polymeric bodies a preferred process is one using irradiation, in an inert atmosphere, with immediate delivery to irradiated bodies of acrylic acid. Preferably the radiation is electron beam or gamma radiation, to a total dose of 10-300 kGy, preferably 20-100 kGy. The acrylic acid is preferably of concentration 20-80 vol %, in water, and the temperature at which the acrylic acid is supplied to the irradiated polymeric bodies is preferably an elevated temperature, for example 30-80° C. Preferably the base polymeric bodies are polyethylene, polypropylene or cellulosic fibres.

In principle, however, any type of insoluble, calcium-binding material can be used.

Preferably the calcium-binding modifying agent is also able to bind magnesium ions.

Preferably the calcium-binding modifying agent is substantially without means to capture anionic species in the water.

Preferably the container, including modifying agent(s) therein, is substantially without means to capture anionic species in the water.

The method of the invention is suitably carried out at a temperature in the range 5 to 100° C., especially 10 to 60° C., most preferably 20 to 60° C.

Preferably the container is able to move freely within the water used in the method. Preferably the container is immersed in the water substantially throughout the method. Thus, it is preferably not in the form of a filter or like body, retained in a fixed orientation, or mounted on a frame (except in the third aspect of the invention, defined hereinafter).

In the method of the invention the container could be a rigid body with microporous openings present throughout its enclosing wall (which term we use to denote a container with one or several facets). It may be spherical or ovoid or cubic or cuboid, or any other convenient shape. It could comprise a rigid body, not necessarily with microporous openings throughout its wall, but having one or more windows of a microporous material, set into its wall. Preferably it is a bag (by which we include a sachet or pouch), having a perforate outer wall, for example of a woven, knitted or preferably non-woven material, of textile or paper. Preferably the wall of a bag comprises sheets of material, each sheet comprising a ply of two or more layers. Thus, should any insoluble modifying agent inside the bag happen to pass through a perforation in one layer it will be presented with at least a second layer. Preferably the wall comprises a sheet with a ply of three or more layers, such that any insoluble modifying agent inside the bag must follow a tortuous pathway if it were to exit the bag through the wall.

FIG. 1 depicts a bag 10 having a perforate outer wall 12 according to one aspect of the invention.

The wall of a bag may conveniently consist of two sheets secured together about their periphery, with the modifying agent therebetween. The modifying agent could comprise a further sheet or sheets. The securement may be by means of adhesive or, preferably, heat sealing. When the securement is by heat sealing the sheets may comprise a thermoplastic to facilitate this. Conventional materials used in tea bag manufacture may be suitable, and the techniques used in making tea bags can be applied to make flexible containers useful in this invention. Such techniques are described in WO 98/36128 and EP 380127A.

The container could be discarded after use, or it could be regenerated, for example using sodium chloride to effect ion exchange, and re-used. A dye could be employed to give a colour change, on exhaustion of the modifying agent inside the container.

The modifying agent within the container could comprise a catalytic material, for example able to degrade soils and/or microorganisms.

Of course, a container may contain more then one type of modifying agent, and/or a modifying agent having a dual function, for example to capture calcium ions and release a beneficial species.

In addition to a substantially insoluble modifying agent the container could contain a soluble solid material or a dispersible solid material which can pass through the walls of the bag when immersed in water. Such a soluble or dispersible solid material could be, for example, any of the materials mentioned above as being possible components of compositions with which the container can be used; but particularly includes a cleaning surfactant.

Furthermore the wall of the container may itself act as a further means for modifying the water, for example by having the capability of capturing undesired species in the water and/or releasing beneficial species. Thus, the wall material could be of a textile material with ion-capturing and/or ion-releasing properties, for example as described above.

In accordance with a second aspect of the invention there is provided a container having an enclosing wall and containing a substantially water-insoluble modifying agent able to bind calcium ions, and a water-soluble or water-dispersible modifying agent comprising a cleaning surfactant, the wall being permeable to water and to the cleaning surfactant dissolved or dispersed therein but impermeable to the substantially water-insoluble modifying agent.

In accordance with a third aspect of the invention there is provided a method of providing improved cleaning in a clothes washing machine, wherein a container containing a substantially water-insoluble sequestrant having a wall permeable to water and to metal ions therein but impermeable to the sequestrant is located in the loading drawer of the machine such that inflowing rinse water flows through the container, thereby effecting the softening of rinse water entering the machine.

Preferably water entering the machine and which is not rinse water does not flow through the container.

The container used in the third aspect may be a rigid body which is shaped to locate snugly in the tray such that the inflowing rinse water is compelled to flow through it. Alternatively it may be a flexible body, for example a bag, which packs into the flow pathway for the rinse water such that the rinse water is compelled to flow through it. This is an efficient approach to softening the water used in clothes washing machines. Suitably the main wash water will not have flowed through the container, but softening thereof is effected by the conventional builders present in the laundry detergent composition. Prior to rinsing, the wash water containing the builders is drained away and only then is the rinse water delivered into the machine, this rinse water having been softened by flowing through the container located in the loading tray. Neither the builders nor the sequestrant in the container are active at the same time as the other. Thus, they do not compete with each other and are not used wastefully.

In accordance with a fourth aspect of the invention there is provided a container having a rigid enclosing wall and containing a substantially water-insoluble calcium ion sequestrant, the wall being permeable to water and to species dissolved therein but impermeable to the sequestrant, wherein the container is adapted to be located in the loading drawer of a clothes washing machine such that inflowing rinse water flows through it. The sequestrant and the container having a rigid wall may be as described above. Preferably the rigid wall is adapted to be located in the loading drawer by mean of firmly interengaging parts as between the container and the loading drawer, for example parts providing snap-fit securement and/or otherwise requiring mechanical force to separate them.

The invention will now be described, by way of example, with reference to the following embodiments.

EXAMPLE 1

Use of Acrylic Acid Grafted Onto Polyethylene Fibres.

Chopped polyethylene fibres of 20 mm length were placed in a plastic bag, purged with nitrogen and sealed. The bag was irradiated with 10 MeV electrons from a linear accelerator. The total radiation dose was 30 kGy. The fibres were removed from the bag and immersed without delay in a nitrogen-purged aqueous solution containing 40 vol % acrylic acid for 45 minutes at 62° C. The grafted fibres were extracted with water overnight. The grafted fibres were placed between two sheets of non-woven polyethylene, which was heat sealed to enclose the grafted fibres. The bag was placed in the drum of a washing machine, with the clothes, at the start of a washing cycle. It was removed, with the clothes, at the end of the cycle, having provided water softening throughout the cycle, to assist the washing process.

EXAMPLE 2

Use of Algin Sequestrants

In this series of examples the use of algins retained in microporous containers, to soften hard water, was assessed.

1 g of PROTANAL LF 20 was placed in between two 5×5 cm sheets of extruded polyester film SN 42 available from Smith & Nephew, York, UK, and which were heat sealed to enclose the algin.

PROTANAL LF 20 is a granular food grade sodium alginate available from FMC Biopolymer.

The pouch was placed in 1 litre of hard tap water (90 mg/l $Ca^{2+}$ approx.).

After 45 minutes most of the pale yellow coarse algin granules had hydrated and became gel-like. We concluded that calcium sequestration was taking place but that the pouch was too small for the quantity of the algin.

Further tests were carried out using ordinary paper tea bag material, in the same hard tap water. Tea bags of square flat form were carefully opened. The tea was discarded and the bags filled with 1 g of test material. The bags were re-sealed with adhesive. The bags were found in further tests to be highly effective.

The further tests were as follows:

| Samples | |
|---|---|
| Control: | BRITA (Trade Mark) water filter ion exchange material, used to purify drinking water. |
| Alginate: | PROTANAL LF20 |
| Alginic acid: | PROTACID F120 |

In each case 1 g of sample material was sealed in a bag made of tea bag paper, as described above.

Dosage:
1 litre hard water was treated with 1 g material in each case.

Water samples were filtered after treatment.

Sample test jars were rinsed with deionised water prior to sample storage.

Testing methods were as follows.

Controls 1.a. Hard Water Sample—Untreated
   Retain in 250 ml glass jar labelled: 1.a.

1.b. Hard Water Sample—Filtered (Whatman No. 4 Filter Paper 15 cm)
   Filter sample into jar.
   Discard first 250 mls.
   Retain second 250 mls in a jar labelled: 1.b.

1.c. Hard Water Sample—Treated
   1.c.i. PROTANAL LF20
   Draw 1 litre tap water and leave on bench for temperature to reach 21° C.
   Add 1 bag containing PROTANAL LF20 to the test water.
      Use magnetic stirrer.
   Leave in contact for 10 minutes.
   After 10 minutes contact remove bag.
   Label a 250 ml glass jar.
   Filter through Whatman No. 4 filter paper (15 cm) into jar.
   Discard first 250 ml.
   Retain next 250 mls for test in jar labelled 1.c.i.
   1.c.ii. PROTACID 120
   Repeat as for 1.c.i.
   Store in jar labelled: 1.c.ii.
   1.c.iii. BRITA Ion Exchange Material
   Repeat as for 1.c.i.
   Store in jar labelled: 1.c.iii.

Effect of pH Changes at 40° C. on Water Treatment Systems
   The aim was to replicate the action in a clothes washing machine, on a smaller scale.

2.a. Hard Water at pH 6 and 40° C.
   A total of 5 litres hard tap water was used.
   2.a.i. Treated With PROTANAL LF20
   Measure 2 litres hard tap water into a 5 liter beaker (equivalent to wash phase of a washing machine).
   Allow temperature to reach 40° C.
   Add 5 bags containing PROTANAL LF20.
   Mix for 45 minutes using magnetic stirrer.
   Remove bags, discard hot water and add bags to 1 litre of freshly drawn cold tap water (Rinse 1).
   Do not heat.
   Stir as detailed above for 10 minutes.
   Filter 250 mls into a labelled glass jar through a Whatman No. 4 filter (label 2.a.i.1).
   Discard and retain a second 250 mls in the jar.
   Add the bags to a 1 litre freshly drawn water (Rinse 2).
   Stir for 10 minutes. Do not heat.

After 10 minutes remove bags and add to a third liter of fresh tap water (Rinse 3).
Filter, discard first 250 ml and retain second 250 ml sample in jar labelled 2.a.i.2.
Stir the third sample for 10 minutes.
After 10 minutes filter, discard, filter and retain second 250 mls, as before.
Store in a jar labelled 2.a.i.3.

2.a.ii. Treated With PROTACID F120
Repeat the test procedure detailed in 2.a.i. using 5 bags containing alginic acid.
Store samples from the three "rinse" cycles in jars labelled:
2.a.ii.1, 2.a.ii.2 and 2.a.ii.3.

2.a.iii. Treated With BRITA Ion Exchange Material
Repeat test procedure detailed in 2.a.i. using 5 bags containing the BRITA material.
Store samples from the three "rinse" cycles in jars labelled:
2.a.iii.1, 2.a.iii.2 and 2.a.iii.3.

2.b. Hard Water at pH 9 and 40° C.

2.b.i. Treated With PROTANAL LF20
Measure 2 litres of hard tap water into a 5 liter beaker.
Add the same large magnetic stirrer as used in 2.a and maintain a good stir.
Add sufficient 1M sodium hydroxide dropwise, using a plastic pipette, to raise the pH to 9.
Raise the temperature to 40° C. with constant stirring.
When this temperature is reached add 5 bags containing PROTANAL LF20.
Repeat procedure detailed in 2.a.i. after "Mix for 45 minutes using magnetic stirrer".
Store the samples from the three rinse cycles in jars labelled:
2.b.i.1, 2.b.i.2 and 2.b.i.3.

2.b.ii Treated With PROTACID F120
Measure 2 litres hard tap water into a 5 litre beaker.
Add the large magnetic stirrer as used in 2.a and maintain a good stir.
Add sufficient 1M sodium hydroxide dropwise from a plastic pipette to raise the pH to 9.
Raise the temperature to 40° C. with constant stirring.
When this temperature is reached add 5 bags containing PROTANAL F120 .
Repeat procedure detailed in 2.a.i. after "Mix for 45 minutes using magnetic stirrer".
Store the samples from the three rinse cycles in jars labelled:
2.b.ii.1, 2.b.ii.2 and 2.b.ii.3.

2.b.iii Treated With BRITA Ion Exchange Material
Repeat the above procedure with 5 bags containing the BRITA ion exchange material.
Store samples from the three "rinse" cycles in jars labelled:
2.b.iii.1, 2.b.iii.2 and 2.b.iii.3.

Effect of High pH and High Temperature on Water Treatment Systems 3.a. Treated With PROTANAL LF20
Measure 2 liters of hard tap water into a 5 liter beaker and add the large magnetic stirrer.
Set to a good stir.
Adjust the pH to pH 11 by adding 1M sodium hydroxide dropwise using a plastic pipette.
Raise temperature to 60° C.
Add 5 bags containing PROTANAL LF20.
Leave for 90 minutes.
Remove the bags and place in 1 liter cold tap water, with a magnetic stirrer.
Repeat the test procedure as detailed in 2.a.i after "Do not heat".
Store the samples from three "rinses" in jars labelled:
3.a.i, 3.a.ii and 3.a.iii.

3.b. Treated With PROTACID F120
Repeat the procedure in 3.a. using 5 bags of PROTACID F120.
Store the samples from three "rinses" in jars labelled:
3.b.i, 3.b.ii and 3.b.iii.

3.c. Treated With BRITA Ion Exchange Material
Repeat the procedure in 3.b. using 5 bags of BRITA ion exchange material.
Store the samples from three "rinses" in jars labelled:
3.c.i, 3.c.ii and 3.c.iii.

Calcium ion concentrations were measured by Atomic Absorption Spectroscopy (AAS) using a Perkin Elmer Atomic Absorption Spectrometer Model 3300 with Windows Software; and by Inductively Coupled Plasma—Atomic Emission Spectroscopy (ICPAES), using a Perkin Elmer Plasma 40 emission ICP instrument. Both AAS and ICPAES are comparative techniques for which calibration curves have to be set up.

In addition an Orion 710 Calcium Ion Selective Electrode was used to measure calcium ion concentration.

The results are shown in Tables 1, 2 and 3 below. The calcium concentrations measured vary according to the test employed. The effect of the sequestrant on the test methods is not known. However certain trends may clearly be seen, for example the high level of effectiveness of PROTACID F120 across a wide pH range.

Copper ion levels were also measured by the ICPAES technique and the results are shown in Table 4 below. Again, the trend suggests that the algins, especially PROTACID F120, can significantly reduce copper ion concentrations.

TABLE 1

| | | | AAS results | | |
| --- | --- | --- | --- | --- | --- |
| | | | | CALCIUM ion conc, PPM | |
| | Conditions | Treatment | Ref No | [Conc] | [Change] % reduction |
| Control* | Hard Tap Water Ambient temp | None | 1.a | 88.7 | |
| | Hard Tap Water Ambient temp | Filtered thro Whatman No 4 | 1.b | 87.5 | |
| Unadjusted | Temp = 21° C. Contact time 10 mins | PROTANAL LF20 | 1.c.i | 91.9 | 4.4 |

TABLE 1-continued

AAS results

| | Conditions | Treatment | Ref No | CALCIUM ion conc, PPM [Conc] | [Change] | % reduction |
|---|---|---|---|---|---|---|
| | Stirred & filtered | | | | | |
| | As above | PROTACID F120 | 1.c.ii | 36.9 | =50.6 | 57.8% |
| | As above | BRITA | 1.c.iii | 90.6 | 2.9 | |
| pH 6 @ 40° C. | Initial 45 min @ 40° C. & ph 6. Followed by 3× 10 min tap water rinses. All rinses filtered. | PROTANAL LF20 | | | | |
| | | Rinse 1 | 2.a.i.1 | 91.2 | 3.7 | |
| | | Rinse 2 | 2.a.i.2 | 90.6 | 3.1 | |
| | | Rinse 3 | 2.a.i.3 | 90.0 | 2.5 | |
| | As above | PROTACID F120 | | | | |
| | | Rinse 1 | 2.a.ii.1 | 53.1 | −34.4 | 39.3% |
| | | Rinse 2 | 2.a.ii.2 | 77.5 | −10.0 | 11.4% |
| | | Rinse 3 | 2.a.ii.3 | 74.4 | −13.1 | 15.0% |
| | As above | BRITA | | | | |
| | | Rinse 1 | 2.a.iii.1 | 80.6 | −6.9 | 7.8% |
| | | Rinse 2 | 2.a.iii.2 | 88.1 | 0.6 | |
| | | Rinse 3 | 2.a.iii.3 | 88.1 | 0.6 | |
| pH 9 @ 40° C. | Initial 45 mins @ 40° C. & pH 9 followed by 3 × 10 min tap water rinses. All rinses filtered. | PROTANAL LF20 | | | | |
| | | Rinse 1 | 2.b.i.1 | 88.1 | 0.6 | |
| | | Rinse 2 | 2.b.i.2 | 86.6 | −0.9 | 1.0% |
| | | Rinse 3 | 2.b.i.3 | 82.5 | −5.0 | |
| | As above | PROTACID F120 | | | | |
| | | Rinse 1 | 2.b.ii.1 | 65.6 | −21.9 | 25.0% |
| | | Rinse 2 | 2.b.ii.2 | 69.4 | −18.1 | 20.7% |
| | | Rinse 3 | 2.b.ii.3 | 31.2 | −56.2 | 64.3% |
| | As above | BRITA | | | | |
| | | Rinse 1 | 2.b.iii.1 | 83.1 | −4.4 | 5.0% |
| | | Rinse 2 | 2.b.iii.2 | 86.2 | −1.2 | 1.4% |
| | | Rinse 3 | 2.b.iii.3 | 86.9 | −0.6 | 0.7% |
| pH 9 @ 60° C. | Initial 90 mins @ 60° C. & pH 11 followed by 3 × 10 min tap water rinses. All rinses filtered. | PROTANAL LF20 | | | | |
| | | Rinse 1 | 3.a.i | 87.5 | 0.00 | |
| | | Rinse 2 | 3.a.ii | 86.9 | −0.6 | 0.7% |
| | | Rinse 3 | 3.a.iii | 86.5 | −1.0 | |
| | As above | PROTACID F120 | | | | |
| | | Rinse 1 | 3.b.i | 86.5 | −1.0 | 1.1% |
| | | Rinse 2 | 3.b.ii | 86.5 | −1.0 | 1.14 |
| | | Rinse 3 | 3.b.iii | 83.1 | −4.4 | 5.0% |
| | As above | BRITA | | | | |
| | | Rinse 1 | 3.c.i | 64.4 | −23.1 | 26.4% |
| | | Rinse 2 | 3.c.ii | 76.9 | −10.6 | 12.1% |
| | | Rinse 3 | 3.c.iii | 81.2 | −6.2 | 7.1% |

*All changes in ion concentrations calculated from this constant.

TABLE 2

ICPAES results on calcium

| | Conditions | Treatment | Ref No | CALCIUM ion conc (PPM) Conc] | [Change] | % reduction |
|---|---|---|---|---|---|---|
| Controls* | Hard Tap Water Ambient Temp | None | 1.a | 129.1 | | |
| | Hard Tap Water Ambient Temp | Filtered thro Whatman No 4 | 1.b | 132.4 | | |
| Unadjusted | Temp = 21° C. Contact time 10 mins Stirred & filtered | PROTANAL LF20 | 1.c.i | 120.8 | −11.6 | 8.8% |
| | As for 1.c.i | PROTACID 120 | 1.c.ii | 83.5 | −48.9 | 36.9% |
| | As for 1.c.i | BRITA | 1.c.iii | 132.8 | 0.4 | |
| pH 6 @ 40° C. | Initial 45 min @ 40° C. & pH 6. Followed by 3 × 10 min tap water rinses. All rinses filtered | PROTANAL LF20 | | | | |
| | | Rinse 1 | 2.a.i.1 | 129.2 | −3.2 | 2.4% |
| | | Rinse 2 | 2.a.i.2 | 125.9 | −6.5 | 4.9% |
| | | Rinse 3 | 2.a.i.3 | 132.2 | −0.2 | 0.1% |
| | As above | PROTACID F120 | | | | |
| | | Rinse 1 | 2.a.ii.1 | 113.3 | −19.1 | 14.4% |

TABLE 2-continued

ICPAES results on calcium

| | | | | CALCIUM ion conc (PPM) | | |
|---|---|---|---|---|---|---|
| Conditions | Treatment | | Ref No | Conc] | [Change] | % reduction |
| | Rinse 2 | | 2.a.ii.2 | 129.2 | −3.2 | 2.4% |
| | Rinse 3 | | 2.a.ii.3 | 111.3 | −21.1 | 16.0% |
| As above | BRITA | | | | | |
| | Rinse 1 | | 2.a.iii.1 | 121.6 | −10.8 | 8.1% |
| | Rinse 2 | | 2.a.iii.2 | 128.1 | −4.3 | 3.2% |
| | Rinse 3 | | 2.a.iii.3 | 128.8 | −3.6 | 2.7% |
| pH 9 @ 40° C. | Initial 45 mins @ 40° C. & pH 9 followed by 3 × 10 min tap water rinses. All rinses filtered. | PROTANAL LF20 | | | | |
| | Rinse 1 | | 2.b.i.1 | 128.7 | −3.4 | 2.5% |
| | Rinse 2 | | 2.b.i.2 | 130.5 | −1.9 | 1.4% |
| | Rinse 3 | | 2.b.i.3 | 126.4 | −6.0 | 4.5% |
| | As above . | PROTACID F120 | | | | |
| | Rinse 1 | | 2.b.ii.1 | 46.6 | −85.7 | 64.8% |
| | Rinse 2 | | 2.b.ii.2 | 114.4 | −18.0 | 13.6% |
| | Rinse 3 | | 2.b.ii.3 | 138.4 | 6.0 | |
| | As above | BRITA | | | | |
| | Rinse 1 | | 2.b.iii.1 | 119.4 | −13.0 | 9.8% |
| | Rinse 2 | | 2.b.iii.2 | 120.5 | −11.9 | 8.9% |
| | Rinse 3 | | 2.b.iii.3 | 126.7 | −5.7 | 4.3% |
| pH 9 @ 60° C. | pH 9 followed by 3 × 10 min tap water rinses. All rinses filtered. | PROTANAL LF20 | | | | |
| | Rinse 1 | | 3.a.i | 121.9 | −10.5 | 7.9% |
| | Rinse 2 | | 3.a.ii | 131.5 | −0.9 | 0.6% |
| | Rinse 3 | | 3.a.iii | 127.1 | −5.3 | 4.0% |
| | As above | PROTACID 120 | | | | |
| | Rinse 1 | | 3.b.i | 116.9 | −15.5 | 11.7% |
| | Rinse 2 | | 3.b.ii | 129.2 | −3.2 | 2.4% |
| | Rinse 3 | | 3.b.iii | 125.8 | −6.6 | 4.9% |
| | As above | BRITA | | | | |
| | Rinse 1 | | 3.c.i | 95.0 | −37.4 | 28.2% |
| | Rinse 2 | | 3.c.ii | 121.4 | −11.0 | 8.3% |
| | Rinse 3 | | 3.c.iii | 130.2 | −2.2 | 1.6% |

*all changes in ion concentration calculated from this constant

TABLE 3

Calcium electrode results

| | | | | CALCIUM Ion Concentration in ppm | | |
|---|---|---|---|---|---|---|
| Conditions | Treatment | | Ref No | (Conc) | (change) | % reduction |
| Controls* | Hard Tap Water Ambient temp | None | 1.a | 232.0 | | |
| | Hard Tap Water Ambient temp | Filtered thro Whatman No 4 | 1.b | 235.0 | | |
| Unadjusted | Temp 21° C. Contact time 10 mins Stirred & tiltered | PROTANAL LF20 | 1.c.i | 225.0 | −10.0 | 4.2% |
| | At above | PROTACID F120 | 1.c.ii | 67.1 | −167.9 | 71.4% |
| | As above | BRITA | 1.c.iii | 211.0 | −24.0 | 10.2% |
| pH 6 @ 40° C. | Initial 45 min @ 40° C. & ph 6. Followed by 3 × 10 min tap water rinses. All rinses filtered. | PROTANAL LF20 | | | | |
| | Rinse 1 | | 2.a.i.1 | 178.0 | −57.0 | 24.2% |
| | Rinse 2 | | 2.a.i.2 | 184.0 | −51.0 | 21.7% |
| | Rinse 3 | | 2.a.i.3 | 173.0 | −62.0 | 26.4% |
| | As above | PROTACID 120 | | | | |
| | Rinse 1 | | 2.a.ii.1 | 115.0 | −120.0 | 51.1% |
| | Rinse 2 | | 2.a.ii.2 | 167.0 | −68.0 | 28.9% |
| | Rinse 3 | | 2.a.ii.3 | 167.0 | −68.0 | 28.9% |
| | As above | BRITA | | | | |
| | Rinse 1 | | 2.a.iii.1 | 169.0 | −66.0 | 28.1% |
| | Rinse 2 | | 2.a.iii.2 | 189.0 | −46.0 | 19.6% |
| | Rinse 3 | | 2.a.iii.3 | 199.0 | −36.0 | 15.3% |
| | | | | 1b reading = 179 mg/l | | |
| pH 9 @ 40° C. | Initial 45 mins @ 40° C. & pH 9 followed by 3 × 10 min tap water | PROTANAL LF20 | | | | |
| | Rinse 1 | | 2.a.i.1 | 219.0 | 57.0 | |
| | Rinse 2 | | 2.b.i.2 | 201.0 | 39.0 | |

TABLE 3-continued

Calcium electrode results

| Conditions | Treatment | Ref No | (Conc) | CALCIUM Ion Concentration in ppm (change) | % reduction |
|---|---|---|---|---|---|
| | rinses. All rinses filtered. | Rinse 3 | 2.b.i.3 | 192.0 | 30.0 | |
| | As above | PROTACID F120 | | | | |
| | | Rinse 1 | 2.b.ii.1 | 147.0 | −15.0 | 9.2% |
| | | Rinse 2 | 2.b.ii.2 | 145.0 | −217.0 | 10.5% |
| | | Rinse 3 | 2.b.ii.3 | 54.4 | −107.6 | 66.4% |
| | As above | BRITA | | | | |
| | | Rinse 1 | 2.b.iii.1 | 204.0 | 42.0 | |
| | | Rinse 2 | 2.b.iii.2 | 204.0 | 42.0 | |
| | | Rinse 3 | 2.b.iii.3 | 198.0 | 36.0 | |
| PH 9 @ 60° C. | Initial 90 mins @ 60° C. & pH 9 followed by 3 × 10 min tap water rinses. All rinses filtered | PROTANAL LF20 | | | | |
| | | Rinse 1 | 3.a.i | 207.0 | 45.0 | |
| | | Rinse 2 | 3.a.ii | 198.0 | 36.0 | |
| | | Rinse 3 | 3.a.iii | 207.0 | 45.0 | |
| | As above | PROTACID 120 | | | | |
| | | Rinse 1 | 3.b.i | 195.0 | 33.0 | |
| | | Rinse 2 | 3.b.ii | 182.0 | 20.0 | |
| | | Rinse 3 | 3.b.iii | 183.0 | 21.0 | |
| | As above | BRITA | | | | |
| | | Rinse 1 | 3.c.i | 110.0 | −52.0 | 32.1% |
| | | Rinse 2 | 3.c.ii | 135.0 | −27.0 | 16.7% |
| | | Rinse 3 | 3.c.iii | 141.0 | −21.0 | 13.09% |

*All changes in ion concentrations calculated from this constant.

TABLE 4

ICPAES results on copper

| Conditions | Treatment | Ref No | [Conc] | COPPER [Change] | % reduction |
|---|---|---|---|---|---|
| Controls* | Hard Tap Water Ambient Temp | None | 1.a | 0.079 | | |
| | Hard Tap Water Ambient Temp | Filtered thro Whatman No 4 | 1.b | 0.163 | | |
| Unadjusted | Temp = 21° C. Contact time 10 mins Stirred & filtered | PROTANAL LF20 | 1.c.i | 1.317 | 1.154 | |
| | As for 1.c.i | PROTACID 120 | 1.c.ii | 0.071 | −0.092 | 56.4% |
| | As for 1.c.i | BRITA | 1.c.iii | 0.244 | 0.081 | |
| pH 6 @ 40° C. | Initial 45 min @ 40° C. & pH 6. Followed by 3 × 10 min tap water rinses. All rinses filtered | PROTANAL LF20 | | | | |
| | | Rinse 1 | 2.a.i.2 | 0.798 | 0.635 | |
| | | Rinse 2 | 2.a.i.2 | 0.238 | 0.675 | |
| | | Rinse 3 | 2.a.i.3 | 0.329 | 0.166 | |
| | As above | PROTACID F120 | | | | |
| | | Rinse 1 | 2.a.ii.1 | 0.194 | 0.031 | |
| | | Rinse 2 | 2.a.ii.2 | 0.307 | 0.144 | |
| | | Rinse 3 | 2.a.ii.3 | 0.173 | 0.010 | |
| | As above | BRITA | | | | |
| | | Rinse 1 | 2.a.iii.1 | 0.301 | 0.138 | |
| | | Rinse 2 | 2.a.iii.2 | 0.432 | 0.269 | |
| | | Rinse 3 | 2.a.iii.3 | 0.495 | 0.332 | |
| pH 9 @ 40° C. | Initial 45 mins @ 40° C. & pH 9 followed by 3 × 10 min tap water rinses. All rinses filtered. | PROTANAL LF20 | | | | |
| | | Rinse 1 | 2.b.i.1 | 0.232 | 0.069 | |
| | | Rinse 2 | 2.b.i.2 | 0.140 | −0.023 | 14.1% |
| | | Rinse 3 | 2.b.i.3 | 0.311 | 0.148 | |
| | As above | PROTACID F120 | | | | |
| | | Rinse 1 | 2.b.ii.1 | 0.055 | −0.108 | 66.2% |
| | | Rinse 2 | 2.b.ii.2 | 0.126 | −0.037 | 22.7% |
| | | Rinse 3 | 2.b.ii.3 | 0.390 | 0.227 | |
| | As above | BRITA | | | | |
| | | Rinse 1 | 2.b.iii.1 | 1.801 | 1.638 | |

TABLE 4-continued

ICPAES results on copper

|  | Conditions | Treatment | Ref No | COPPER [Conc] | [Change] | % reduction |
|---|---|---|---|---|---|---|
|  |  | Rinse 2 | 2.b.iii.2 | 0.462 | 0.299 |  |
|  |  | Rinse 3 | 2.b.iii.3 | 0.268 | 1.5 |  |
| pH 9 @ 60° C. | pH 9 followed by 3 × 10 min tap water rinses. All rinses filtered. | PROTANAL LF20 |  |  |  |  |
|  |  | Rinse 1 | 3.a.i | 0.300 | 0.137 |  |
|  |  | Rinse 2 | 3.a.ii | 0.325 | 0.162 |  |
|  |  | Rinse 3 | 3.a.iii | 0.166 | 0.003 |  |
|  | As above | PROTACID 120 |  |  |  |  |
|  |  | Rinse 1 | 3.b.i | 0.171 | 0.008 |  |
|  |  | Rinse 2 | 3.b.ii | 0.159 | −0.004 | 2.4% |
|  |  | Rinse 3 | 3.b.iii | 0.323 | 0.167 |  |
|  | As above | BRITA |  |  |  |  |
|  |  | Rinse 1 | 3.c.i | 0.232 | 0.069 |  |
|  |  | Rinse 2 | 3.c.ii | 0.192 | 0.029 |  |
|  |  | Rinse 3 | 3.c.iii | 0.231 | 0.068 |  |

*all changes in ion concentration calculated from this constant

A further test was carried out to assess effectiveness at pH 10.5, the typical pH of the washing medium in part of a washing machine cycle.

If the pH of the same hard water is raised to 10.5 by the addition of 1M sodium hydroxide dropwise, the solution becomes cloudy at pH 10.5 and a precipitate of insoluble calcium hydroxide falls to the bottom of the container on standing.

1 g samples of sequestrants, contained in bags made as described above from tea bag material, were added to 800 g of the same hard tap water, stirred for 2 minutes and then the pH of the solution increased to pH 10.5 by the addition of 1M sodium hydroxide, dropwise. The solution was stirred throughout the test to ensure thorough mixing. Any cloudiness or precipitate was noted.

The test was repeated with increasing amounts of sequestrant until no cloudiness or precipitate was seen at pH 10.5. We concluded that sufficient sequestrant had been added initially to react with all the dissolved calcium, leaving none free to precipitate at pH 10.5.

Results

| Sequestrant | Mass of sequestrant required to react with all dissolved calcium |
|---|---|
| 1. PROTACID P120 | 1 g |
| 2. PROTANAL LF20 | 4 g |
| 3. BRITA ion exchange | 4 g |

EXAMPLE 3

Use of Algin Suquestrant With Different Bag Materials

In further experiments alternative bag materials were explored, namely J R Crompton's polypropylene-faced cellulose papers identified below and SciMAT's polypropylene paper. Information on these is as follows.

| Make | Ref No | Grammage (gsm) | Air Permeab. $m^3/min/m^2$ | Wet burst strength |
|---|---|---|---|---|
| JR Crompton | 474604 | 21.0 | 50 | 22 kPa |
| JR Crompton | 474608 | 27.5 | 36 | 32 kPa |
| SciMAT | 700/9 | 45-45 |  |  |

The bags were made by heat sealing together 7 cm×7 cm sheets of the papers, with PROTACID F120 (1 g) between them. The filled bags were placed in containers containing the same hard water (1 liter) and stirred for 30 minutes. The water was then observed by eye, and the condition recorded, as noted in the following table.

| Material | Duration of stirring | Observations after 30 minutes |
|---|---|---|
| 474608 | 30 mins | Water remained clear |
| 474604 | 30 mins | Slight cloudiness |
| SciMAT | 30 mins | Slight leakage/cloudiness |

EXAMPLE 4

Use of Functionalised Viscose in Bag

In further experiments J. R. Crompton's SUPERSEAL (trade mark) three-ply tea bag paper, ref no. 478404, grammage 26.0 gsm, was used to retain radiation grafted viscose fibres. The chopped viscose fibres had been irradiated under a nitrogen atmosphere using an electron-beam accelerator. Once the dosage had reached a specified value in kGy the fibres had been immersed immediately in a nitrogen-purged aqueous solution of acrylic acid, at a moderately elevated temperature.

A first bag, 7 cm×7 cm, contained 0.884 g of functionalised fibres (19% dry weight) and reduced the calcium ion concentration of a hard water from 174.3 ppm to 132.3 ppm. A second bag, 7 cm×7 cm, contained 1.768 g of functionalised fibres and reduced the calcium ion concentration of a hard water from 168.3 ppm to 92.3 ppm, (both measured by EDTA titration)

EXAMPLE 5

Use of Laminated Radiation Grafted Cloth in Container

A heat sealed laminate comprised a middle calcium sequestrant layer between two outer layers, the latter forming a container for the sequestrant layer.

Composition of each outer layer:
20 g/m² sheet weight, laid (non-woven) fibres, a blend of:
20% cellulose, 10 mm staple length
40% viscose, 10 mm staple length
20% polyester bicomponent, 6 mm staple length
20% polyester bicomponent, 12 mm staple length Composition of middle layer:
75 g/m² sheet weight, laid (non-woven) fibres, a blend of:
80% 10 mm staple length viscose fibres radiation grafted with 7.5 mM/g carboxylate functionality
10% polyester bicomponent, 6 mm staple length
10% polyester bicomponent, 12 mm staple length A 4.5 cm×4.5 cm piece of this container immersed for 30 minutes in 500 ml hard water, at 60° C., reduced the calcium ion level from 170 mg/l to 143 mg/l (determined by EDTA titration).

EXAMPLE 6

Use of Polyacrylate Cloth in Container

Polyacrylate fibres are made by copolymerising acrylic acid, sodium acrylate, methacrylic acid and hydroxypropylmethacrylic acid in an aqueous premix. Polymerisation is initiated by ammonium persulphate. The resulting crosslinked polymer is extruded into a hot air stream into fibres. These fibres are then incorporated with other fibres into a non-woven cloth. In this example the cloth was 145 g/m² sheet weight, of:
50% wt polyacrylate fibre, described above
50% wt polyester bicomponent This non-woven cloth was retained within a layer of 30 g/m² spunbonded polypropylene laminated onto both sides to give a three layer flat-form container.

A 4.5 cm×4.5 cm piece of this container immersed for 30 minutes in 500 ml hard water, at 60° C., reduced the calcium level from 170 mg/l to 148 mg/l (determined by EDTA titration).

EXAMPLE 7

Machine Wash Tests

The containers described in Examples 5 and 6 were used in washing machine testing in order to assess calcium carbonate encrustation on the heating element. The washing machine employed was a CANDY 80 PLUS (trade mark). Each washing load was 3.5 kg. A 60° C. programme was selected. The water hardness was 172 mg/l Ca²⁺. The detergent employed was 168 g DASH ESSENTIAL (trade mark), a commercial washing powder available in supermarkets in Italy, having the following composition (by weight):

| | |
|---|---|
| anionic surfactant | 11.7% |
| zeolite | 18.9% |
| sodium silicate | 2.7% |
| sodium citrate | 3.5% |

-continued

| | |
|---|---|
| sodium carbonate | 25.9% |
| sodium percarbonate | 11.5% |
| TAED | 1.4% |
| Protease | 0.2% |
| Amylase | 0.8% |
| Phosphonate | 0.3% |
| Polymer | 1.6% |

Prior to the experiments the washing machine element was weighed. It was re-weighed after 15 washes. The results were as follows:

| | |
|---|---|
| Detergent alone | 660 mg HEE |
| Detergent + Ex.5 tri-ply container | 560 mg HEE |
| Detergent + Ex.6 tri-ply container | 450 mg HEE |
| HEE = Heating Element Encrustation | |

All containers were approximately 625 cm² in area and a fresh container was used for each wash cycle.

The invention claimed is:

1. A method of cleaning household articles comprising contacting cleaning water with a container having an enclosing wall and containing a water-soluble or water-dispersible modifying agent able to change the properties of water and a substantially water-insoluble modifying agent which binds calcium ions in the cleaning water, the wall being permeable to the water and to components dissolved therein but retaining the substantially water-insoluble modifying agent during the method of cleaning, wherein the enclosing wall comprises sequestrant side chains grafted thereon.

2. A method as claimed in claim 1, wherein the method is a ware washing method using a ware washing machine.

3. A method as claimed in claim 2, wherein the machine is a clothes washing machine.

4. A method as claimed in claim 1, wherein the method is a manual cleaning method.

5. A method as claimed in claim 1, wherein the container is a bag.

6. A method as claimed in claim 1, wherein the substantially water-insoluble modifying agent is an algin.

7. A method as claimed in claim 1, wherein the substantially water-insoluble modifying agent is an ion exchange resin.

8. A method as claimed in claim 1, wherein to container wall itself also changes the properties of the water.

9. A method as claimed in claim 1, wherein a dye is employed to give a color change, on exhaustion of the water-insoluble modifying agent.

10. A method as claimed in claim 1 wherein the container does not contain a cleaning surfactant which can pass through the walls of the container when immersed in water.

11. A method as claimed in claim 1, wherein the water-soluble or water dispersible modifying agent comprises a cleaning surfactant.

12. The method according to claim 1 wherein the sequestrant side chain is selected from the group consisting of residues of acrylic acid, residues of methacrylic acid, residues of carboxylic acid, residues of sulphonic acid, residues of phosphonic acid and mixtures thereof.

13. A container comprising an enclosing wall and a substantially water-insoluble modifying agent able to bind calcium ions, and a water-soluble or water-dispersible modifying agent comprising a cleaning surfactant, the wall being permeable to water and to the cleaning surfactant dissolved or dispersed therein but impermeable to the substantially water-insoluble modifying agent, wherein the enclosing wall comprises sequestrant side chains grafted thereon.

14. The container according to claim 13 wherein the sequestrant side chain is selected from the group consisting of residues of acrylic acid, residues of methacrylic acid, residues of carboxylic acid, residues of sulphonic acid, residues of phosphonic acid and mixtures thereof.

15. A method of providing improved cleaning in a clothes washing machine, the method comprising placing a container comprising an enclosing wall, a water-soluble or water-dispersible modifying agent able to change the properties of water and a substantially water-insoluble sequestrant, wherein the wall is permeable to water and to metal ions therein but impermeable to the sequestrant in the loading drawer of the machine such that inflowing rinse water flows through the container, thereby effecting the softening of rinse water entering the machine, wherein the enclosing wall comprises sequestrant side chains grafted thereon.

16. The method according to claim 15 wherein the sequestrant side chain is selected from the group consisting of residues of acrylic acid, residues of methacrylic acid, residues of carboxylic acid, residues of sulphonic acid, residues of phosphonic acid and mixtures thereof.

17. A container comprising a rigid enclosing wall, a water-soluble or water-dispersible modifying agent able to change the properties of water and a substantially water-insoluble calcium ion sequestrant, the wall being permeable to water and to species dissolved therein but impermeable to the sequestrant, wherein the container is adapted to be located in the loading drawer of a clothes washing machine such that inflowing rinse water flows through it, wherein the enclosing wall comprises sequestrant side chains grafted thereon.

18. The container according to claim 17 wherein the sequestrant side chain is selected from the group consisting of residues of acrylic acid, residues of methacrylic acid, residues of carboxylic acid, residues of sulphonic acid, residues of phosphonic acid and mixtures thereof.

* * * * *

UNITED STATES PATENT AND TRADEMARK OFFICE
CERTIFICATE OF CORRECTION

PATENT NO. : 7,377,945 B2 Page 1 of 1
APPLICATION NO. : 10/363346
DATED : May 27, 2008
INVENTOR(S) : Gay Joyce Cornelius et al.

It is certified that error appears in the above-identified patent and that said Letters Patent is hereby corrected as shown below:

On the Title Page, Item (73) "Assignee":
Reckltt Bencklser (UK) Limited, Slough, Berkshire (GB)

should read:
Reckitt Benckiser (UK) Limited, Slough, Berkshire (GB)

Signed and Sealed this

Twenty-sixth Day of August, 2008

JON W. DUDAS
*Director of the United States Patent and Trademark Office*